Sept. 28, 1937.   G. A. LYON   2,094,326
ORNAMENTAL PLATE FOR WHEELS
Filed June 26, 1933   2 Sheets-Sheet 1
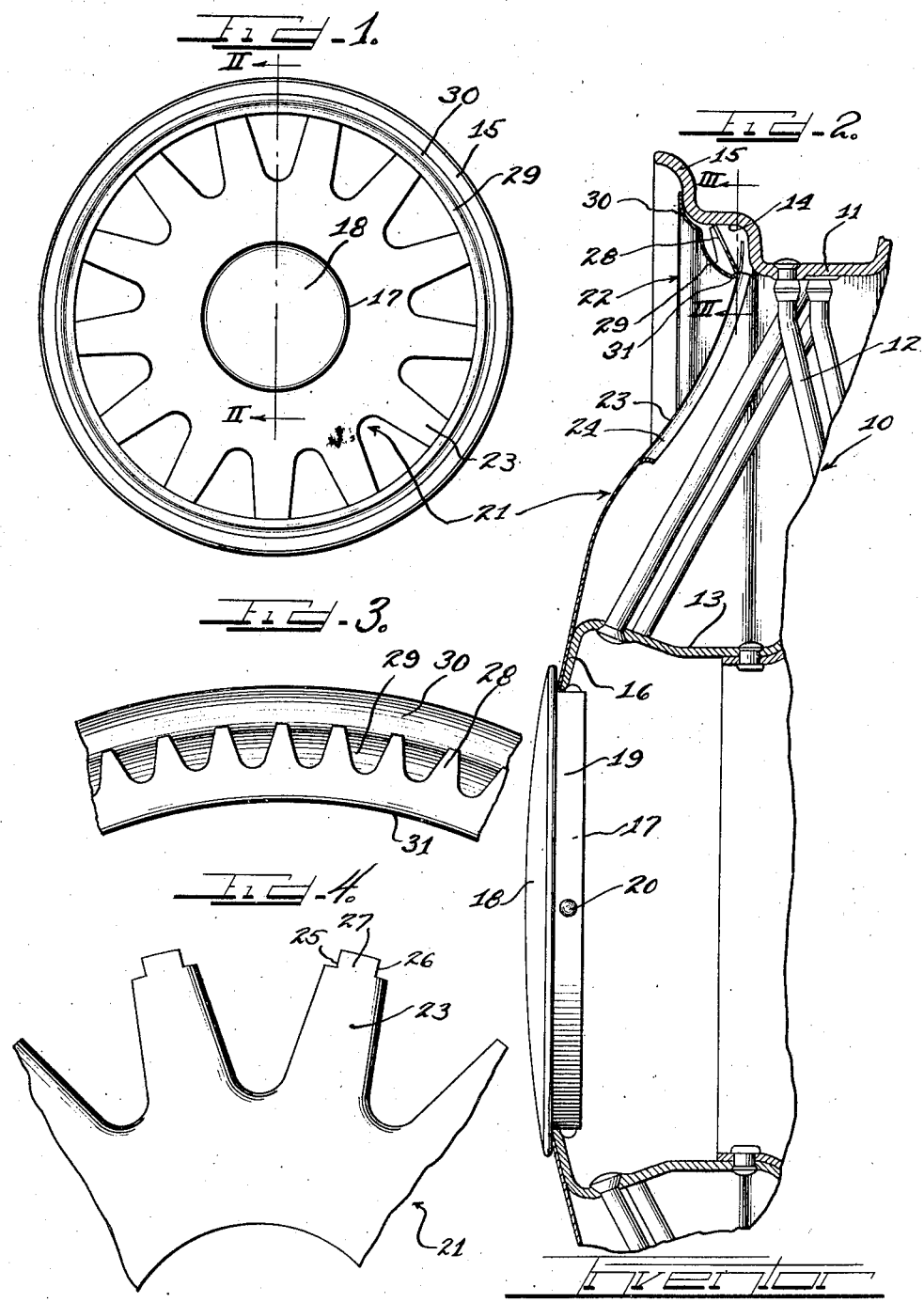
George Albert Lyon.

Sept. 28, 1937.   G. A. LYON   2,094,326
ORNAMENTAL PLATE FOR WHEELS
Filed June 26, 1933   2 Sheets-Sheet 2
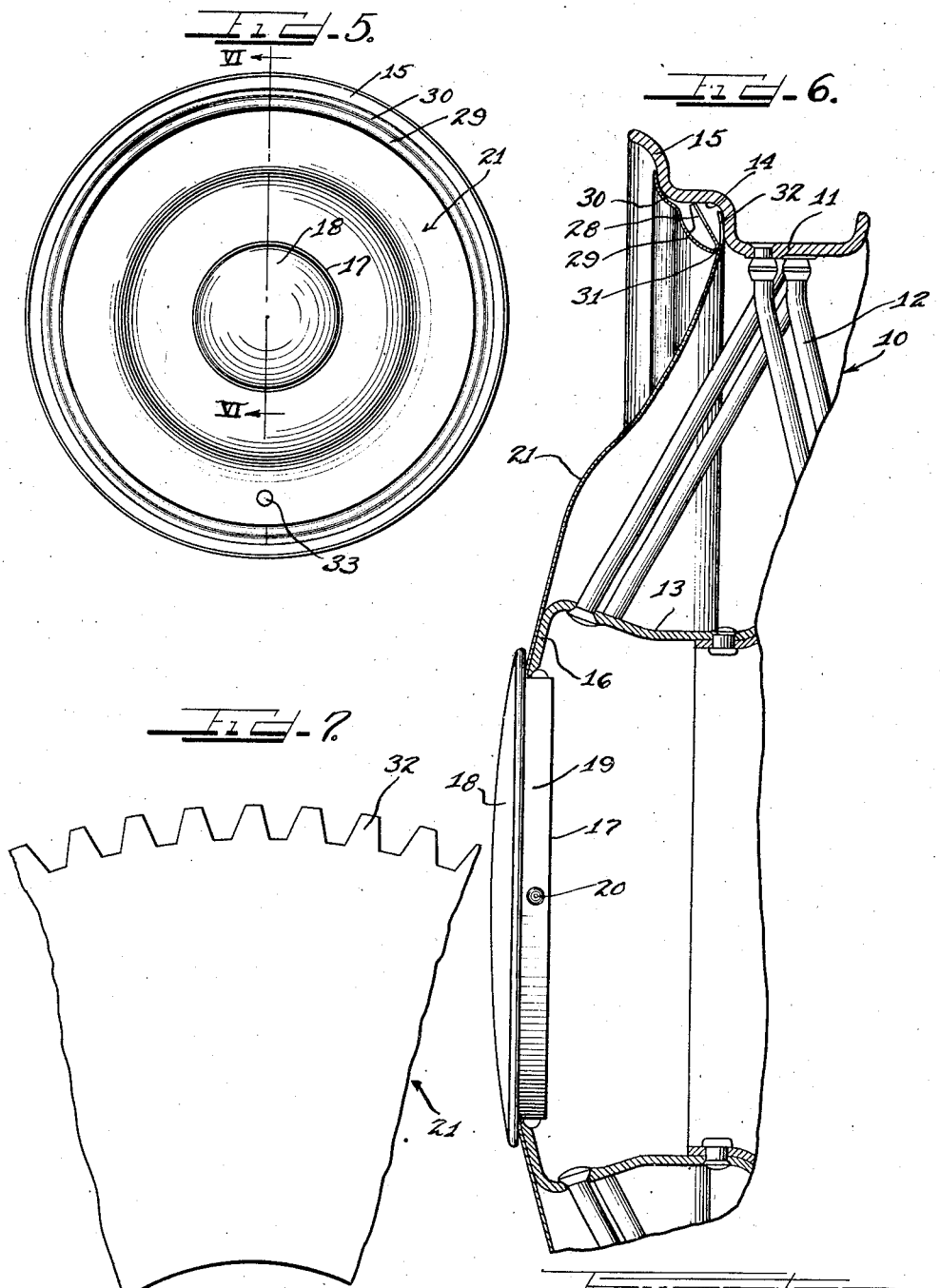
Inventor
George Albert Lyon.
by Charles W. Hills Attys.

Patented Sept. 28, 1937

2,094,326

UNITED STATES PATENT OFFICE 2,094,326

ORNAMENTAL PLATE FOR WHEELS

George Albert Lyon, Detroit, Mich.

Application June 26, 1933, Serial No. 677,549

2 Claims. (Cl. 301—37)

The present invention relates in general to an ornamental plate structure for an automobile wheel and is particularly concerned with an ornamental ring-like plate adapted to be disposed between the wheel rim and hub of an automobile wheel to partially or wholly cover the spokes of the wheel, and improved means for retaining the plate in proper position over the spokes.

An object of the invention is to provide an ornamental plate structure for disposition over the spokes of an automobile wheel, which may be so secured in position as to not require any modification or change in the automobile wheel.

It is a further object of this invention to provide an ornamental plate structure for disposition over the spokes of an automobile wheel, which is so constructed that, when attached to the wheel, tensional forces are set up which act to resist movement of the plate relative to the wheel.

It is also an object of the invention to provide an ornamental plate structure of the character described which is so formed as to simulate wheel spokes, and which, if desired, may be utilized to simulate spokes of a different type than those actually embodied in the wheel structure.

Still another object is to provide in connection with an ornamental plate structure for disposition over the spokes of an automobile wheel, improved means for securing the plate in cooperation with the rim and the hub of the wheel.

In accordance with the general features of the invention, there is provided a ring-like plate having its outer periphery formed into radially projecting portions which may be in the form of spokes or in case the plate is to be continuous for entirely covering the spokes of the wheel, the projecting portions may simply be peripheral teeth for cooperation with the rim of the wheel.

In the preferred form of the invention, the disk is spoked and the depth of the dished plate is left so that the inner periphery will seat on the hub and the outer periphery will be spaced away from the cooperative rim portion of the wheel. In the modified form of the invention, the disk is not spoked, but as in the preferred form is held both at the rim and hub of the wheel.

As an additional feature of the invention, it is contemplated to form the ornamental plate in such a manner that the radial projecting portions will simulate wheel spokes. These spokes may be of an ornamental character differing from those utilized in the wheel construction. For example, the wheel may be of the type using wire spokes and the ornamental plate may be of the wood type in appearance. Obviously, the spokes of the ornamental wheel may be of any design desired and need not necessarily extend in a radial direction.

Other objects and features of this invention will more fully appear from the following detailed description taken in connection with the accompanying drawings which illustrate several embodiments thereof, and in which Figure 1 is a view in elevation showing the ornamental plate structure of this invention applied to a wheel;

Figure 2 is an enlarged fragmentary sectional view taken substantially on line II—II of Figure 1;

Figure 3 is a fragmentary detailed view of a portion of the circular bead taken substantially on line III—III of Figure 2;

Figure 4 is an enlarged fragmentary view in elevation of a portion of the ornamental plate of this invention, showing details of the spoke construction;

Figure 5 is a view in elevation showing a modified form of my ornamental plate structure applied to a wheel;

Figure 6 is an enlarged fragmentary sectional view of the same taken substantially on line VI—VI of Figure 5; and Figure 7 is a fragmentary view of a portion of my ornamental structure, showing the teeth on the outer periphery of the ring-like plate.

As shown on the drawings:

In the illustrated embodiment of this invention, there is shown a conventional wheel which is generally indicated by the numeral 10. This wheel includes a rim portion 11 which is connected by spokes 12 to a wheel hub 13.

The wheel rim 11 is provided with an inner annular surface 14 which is adapted to cooperate with the outer periphery of my novel ornamental plate structure. This surface terminates in an outwardly extending flange or lip 15 which is formed to extend around and engage the bead of a conventional tire. The particular wheel structure which I have chosen to illustrate in connection with my invention is of the so-called drop-center type, such as is extensively used at the present time in the automobile industry.

The hub 13 of the wheel comprises a cylindrically formed housing, the wall of which has the spokes of the wheel secured therein. This wall is inwardly deflected as shown at 16 to form an annular flange defining an opening for receiving a hub cap 17.

The hub cap 17 is of the conventional type and comprises a disc or plate portion 18 which may have a plated or burnished surface provided with any desired identification, such as the make of car. Inwardly spaced from the rear surface of this disc is an annular flange 19 which extends through the opening in the end of the hub. Spring actuated detents 20 are carried by the flange 19, and these detents are so positioned that, when the hub cap is inserted in the end of the hub, the detents extend over the inner surface of the flange 16, and the plate 18 extends over the outer surface of the flange 16. In the preferred embodiment of my invention, the ornamental device for disposition over the wheel spokes 12 between the rim 11 and the hub 13 comprises a plate 21 of curved transverse cross-section and a circular bead 22 which is also of curved transverse cross-section.

The ornamental character of the plate 21, in this form of the invention, is enhanced by providing radially extending spokes 23 around the periphery of the plate. These spokes may be of any desirable shape and need not necessarily extend radially as illustrated in the drawings. In order to strengthen the spokes circumferentially of the plate, the lateral margins of the spokes are deflected to form a flanged edge as shown at 24. The outer ends of the spokes are provided with lateral notches 25 and 26 which define a yieldable projecting portion 27, this projecting portion being devoid of lateral flanges such as provided on the spokes proper. Moreover, the spokes which are provided on the ornamental plate structure may be of a different type than those employed in the wheel construction. That is, the ornamental plate may embody spokes which simulate the wood type of construction, and the wheel spokes may be of the conventional wire type. The projections 27 serve to enable a better fit between the ends of the spokes and the rim of the wheel with which the ends of the spokes cooperate.

The plate 21 may be of any suitable configuration or shape and is illustrated in the accompanying drawings as being of a transversely curved cross-section so as to be disposed in close proximity and overlie the spokes 12 of the wheel. It will be apparent that the outer surface of this plate as well as that of the bead may be given any desirable ornamental finish, but is preferably provided with a lustrous finish such as is secured by plating it with nickel or chromium.

In mounting the plate on the wheel, the inner margin extends over the outer surface of the flange 16 and is held thereagainst by the overlying edge of the plate or disc 18 of the hub cap. The outer ends of the spokes 23 are spaced from the surface 14 of the rim 11.

The outer ends of the spokes are secured in cooperative position with the rim by means of the bead 22. This bead includes underturned yieldable teeth or projections 28 for biting into the rim surface 14 in close proximity to the projections 27 of the spokes. These diagonally extending teeth or projections 28 are normally concealed by an outer transversely curved portion 29 which terminates in a curved extension 30 adapted to overlie a portion of the outwardly extending flange or lip 15 of the wheel rim 11. This circular bead 22 is preferably in the form of a continuous circle that is adapted to be retained in place on the wheel rim solely by reason of the engagement of the yieldable teeth 28 with the rim surface 14.

At the junction 31 of the toothed portion 28 and the outer portion 29 of the bead, it will be noted from Figure 2 that this junction portion is adapted to bear against the ends of the spokes. Moreover, as the bead 22 is more tightly pressed into engagement with the plate 21, the spokes will be deflected slightly in a direction of the wheel axis. By deflecting the spokes in this manner, tensional forces are set up in the plate 21 acting to resist relative movement of the plate to the wheel and thereby tending to prevent the plate from rattling.

In the form of the invention which has just been described, it will be observed that the disk is spoked and the depth or amount of curvature of the dished plate is less than the distance between the plane of the cooperative rim portion and the plane of the cooperative hub portion. On the other hand in the modified form of the invention, which will now be described and which is disclosed in Figures 5, 6 and 7, the disk 21 is not spoked but consists of a solid plate of thin relatively rigid or form-retaining material having some yieldability or resiliency such as is present in a thin metallic sheet.

In the modified form of the invention, shown in Figs. 5, 6 and 7 the plate or disk 21 has a bead 22 which when it is secured in position forces teeth 32 of the plate to tightly engage the cooperating rim portion. The hub cap 17 is then inserted in place and the inner margin of the plate 21 is thereby held in engagement with the flange 16 of the wheel hub. As in the preferred form of the invention, a deflection or springing of the plate sets up tensional forces which act to resist movement of the plate relative to the wheel. Corresponding numerals have been used to indicate parts in the modified form of the invention which are the same as the corresponding parts in the preferred form of the invention, except as otherwise noted.

In the modified form of the invention, the plate is provided with an opening 33, as shown in Figure 5 which is adapted to accommodate an extension connection to the valve stem of the inner tube carried by the wheel rim so that access may be had to the valve stem for the purpose of inflating and deflating the tire. Any suitable valve stem extension may be used for this purpose.

Now I desire it understood that although I have illustrated in detail several embodiments of this invention, the invention is not to be thus limited, but only insofar as defined by the scope and spirit of the appended claims.

I claim as my invention:

1. In combination, a wheel including rim and hub portions with connecting means therebetween, a wheel cover for disposition over an outer side of the wheel comprising a spoke-like circular member disposed over said wheel connecting means and having its spokes terminating adjacent the rim portion and means for resiliently and detachably clamping the cover to the hub portion in such manner as to enable the spokes of the cover to be held under tension, the ends of said spokes being free and being flexed inwardly with respect to their normal position about the bearing for the wheel cover afforded by its contact with said hub portion.

2. In combination, a wheel including rim and hub portions and connecting means therebetween, a wheel cover for disposition over an outer side of the wheel comprising a circular member disposed over said connecting means and having its peripheral portion provided with circumferentially spaced flexible projections terminating adjacent the rim portion and held under tension but detached from said wheel connecting means said projections being flexed inwardly about the bearing for the wheel cover afforded by its contact with said hub portion.

GEORGE ALBERT LYON.